(12) United States Patent
Cheverton et al.

(10) Patent No.: US 10,500,675 B2
(45) Date of Patent: Dec. 10, 2019

(54) ADDITIVE MANUFACTURING SYSTEMS INCLUDING AN IMAGING DEVICE AND METHODS OF OPERATING SUCH SYSTEMS

(71) Applicant: General Electric Company, Schenectady, NY (US)

(72) Inventors: Mark Allen Cheverton, Mechanicville, NY (US); Harry Kirk Mathews, Jr., Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1073 days.

(21) Appl. No.: 14/929,948

(22) Filed: Nov. 2, 2015

(65) Prior Publication Data
US 2017/0120376 A1 May 4, 2017

(51) Int. Cl.
*B23K 26/03* (2006.01)
*B33Y 10/00* (2015.01)
(Continued)

(52) U.S. Cl.
CPC .......... *B23K 26/032* (2013.01); *B22F 3/1055* (2013.01); *B23K 26/144* (2015.10); *B23K 26/342* (2015.10); *B29C 64/153* (2017.08); *B29C 64/386* (2017.08); *B33Y 10/00* (2014.12); *B33Y 30/00* (2014.12); *B33Y 50/02* (2014.12); *B22F 2003/1056* (2013.01);
(Continued)

(58) Field of Classification Search
CPC .. B23K 26/032; B23K 26/342; B23K 26/144; B33Y 30/00

USPC ........... 219/121.63, 121.64, 121.67, 121.72, 219/121.83
See application file for complete search history.

(56) References Cited

U.S. PATENT DOCUMENTS

| 5,264,678 A | 11/1993 | Powell et al. |
| 5,961,859 A * | 10/1999 | Chou .................. B23K 26/032 |
| | | 219/121.63 |

(Continued)

FOREIGN PATENT DOCUMENTS

| EP | 3095591 A1 * | 11/2016 | ......... G06T 7/0004 |
| JP | 2004-306612 A | 11/2004 | |
| WO | 2015/040185 A1 | 3/2015 | |

OTHER PUBLICATIONS

Anonymous, "Digital single-lens reflex camera," Wikipedia, Retrieved for the Internet URL: https://en.wikipedia.org/w/index.php?title=Digital_single-lens_reflex_camera&oldid=687617062, on Feb. 2, 2017, pp. 1-15.

(Continued)

*Primary Examiner* — Thien S Tran
(74) *Attorney, Agent, or Firm* — Armstrong Teasdale LLP (57) ABSTRACT

An additive manufacturing system includes a surface holding a particulate and a focused energy source configured to generate at least one beam that moves along the surface to heat the particulate to a melting point creating a melt path. A camera is configured to generate an image of the surface as the at least one beam moves along the surface. The camera has a field of view and is positioned in relation to the surface such that the field of view encompasses a portion of the melt path defining a plurality of rasters. The camera generates a time exposure image of at least the portion of the melt path defining the plurality of rasters.

17 Claims, 2 Drawing Sheets

(51) Int. Cl.
  *B33Y 30/00* (2015.01)
  *B23K 26/144* (2014.01)
  *B23K 26/342* (2014.01)
  *B22F 3/105* (2006.01)
  *B33Y 50/02* (2015.01)
  *B29C 64/153* (2017.01)
  *B29C 64/386* (2017.01)

(52) U.S. Cl.
  CPC ... *B22F 2003/1057* (2013.01); *B22F 2999/00* (2013.01); *Y02P 10/295* (2015.11)

(56) References Cited

U.S. PATENT DOCUMENTS

| | | | |
|---|---|---|---|
| 2011/0061591 A1* | 3/2011 | Stecker | B22F 3/1055 118/663 |
| 2013/0168902 A1 | 7/2013 | Herzog et al. | |
| 2014/0163717 A1 | 6/2014 | Das et al. | |
| 2014/0265047 A1* | 9/2014 | Burris | B23K 26/034 264/497 |
| 2015/0004046 A1 | 1/2015 | Graham et al. | |
| 2015/0048064 A1 | 2/2015 | Cheverton et al. | |
| 2015/0165683 A1 | 6/2015 | Cheverton et al. | |
| 2015/0177158 A1 | 6/2015 | Cheverton | |
| 2016/0344948 A1* | 11/2016 | Bamberg | G06T 7/0004 |

OTHER PUBLICATIONS

Krauss, H., et al., "Thermography for Monitoring the Selective Laser Melting Process," Proceedings of the Annual International Solid Freeform Fabrication Symposium, pp. 999-1014 (Aug. 22, 2012).

Extended European Search Report and Opinion issued in connection with corresponding EP Application No. 16196237.8 dated Mar. 2, 2017.

Notification of Reasons for Refusal issued in connection with corresponding JP Application No. 2016-208247 dated Nov. 21, 2017.

Xing et al., "Real-time Sensing and Control of Metal Powder Laser Forming", Intelligent Control and Automation, 2006. WCICA 2006. The Sixth World Congress on, vol. 2, pp. 6661-6665, Jun. 21-23, 2006, Dalian.

Baskoro et al., "Monitoring of molten pool image during pipe welding in gas metal arc welding (GMAW) using machine vision", Advanced Computer Science and Information System (ICACSIS), 2011 International Conference on, pp. 381-384, Dec. 17-18, 2011, Jakarta.

* cited by examiner

ADDITIVE MANUFACTURING SYSTEMS INCLUDING AN IMAGING DEVICE AND METHODS OF OPERATING SUCH SYSTEMS

BACKGROUND

The subject matter disclosed herein relates generally to additive manufacturing systems and, more particularly, to additive manufacturing systems including imaging devices for imaging melted particulate during an additive manufacturing process.

At least some additive manufacturing systems involve the buildup of a metal component to make a net, or near net shape component. These systems produce complex components from expensive materials at a reduced cost and with improved manufacturing efficiency. Some known additive manufacturing systems, such as Direct Metal Laser Melting (DMLM), Selective Laser Sintering (SLS), Direct Metal Laser Sintering (DMLS), Selective Laser Melting (SLM) and LaserCusing systems, fabricate components using a focused energy source, such as a laser device or an electron beam generator, and a particulate, such as a powdered metal.

In some known additive manufacturing systems, component quality is reduced due to excess heat and/or variation in heat being transferred to the metal powder by the focused energy source within the melt pool. For example, sometimes local overheating occurs, particularly at overhangs. In addition, in some known additive manufacturing systems, component surface quality, particularly at overhangs or downward facing surfaces, is reduced due to the variation in conductive heat transfer between the powdered metal and the surrounding solid material of the component. For example, the melt pool produced by the focused energy source sometimes becomes too large resulting in the melted metal spreading into the surrounding powdered metal as well as the melt pool penetrating deeper into the powder bed, pulling in additional powder into the melt pool. The increased melt pool size and depth, and the flow of molten metal result in a poor surface finish of the overhang or downward facing surface.

In addition, in some known additive manufacturing systems, the component's dimensional accuracy and small feature resolution is reduced due to melt pool variations because of the variability of thermal conductivity of the subsurface structures and metallic powder. As the melt pool size varies, the accuracy of printed structures varies, especially at the edges of features.

At least some known additive manufacturing systems include imaging devices to generate images of portions of the melt pool during the fabrication process. The imaging devices include a camera with a shutter that is opened for extremely short periods of time. The imaging devices track the focused energy source to capture light during the melting process. However, the imaging devices generate images of only portions of the melt pool. Moreover, the imaging devices generate images of portions of the melt pool without reference to specific positions. In addition, the imaging devices require complex programming and apparatus customized for the specific additive manufacturing system.

BRIEF DESCRIPTION

In one aspect, an additive manufacturing system includes a surface holding a particulate and a focused energy source configured to generate at least one beam that moves along the surface to heat the particulate to a melting point creating a melt path. A camera is configured to generate an image of the surface as the at least one beam moves along the surface. The camera has a field of view and is positioned in relation to the surface such that the field of view encompasses a portion of the melt path defining a plurality of rasters. The camera generates a time exposure image of at least the portion of the melt path defining the plurality of rasters.

In another aspect, a method of manufacturing a part using an additive manufacturing system includes depositing a layer of particulate on a surface. The particulate is heated to a melting point of the particulate using a focused energy source. A beam of the focused energy source is directed at the particulate and a melt pool is formed that emits a melt pool light. The beam is moved to generate a melt pool path. A camera is exposed to the melt pool light and a time exposure image is generated of at least a portion of the melt pool path with the camera.

In yet another aspect, an imaging device for use in an additive manufacturing system including a surface holding a particulate and a focused energy source configured to generate at least one beam that moves along the surface to heat the particulate to a melting point is provided. The imaging device includes a camera. The camera includes a sensor and a casing defining an aperture for light to travel through and strike the sensor. The imaging device further includes a trigger configured to receive a signal relating to an operating characteristic of the focused energy source and to control the travel of light through the aperture based on the signal such that the camera generates a time exposure image of the particulate during operation of the focused energy source.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the terms "time exposure image" and "long exposure image" refer to an image generated by exposing a sensor of an imaging device to light for an extended period of time.

The systems and methods described herein relate to additive manufacturing systems, such as Direct Metal Laser Melting (DMLM) systems. The embodiments described herein include a focused energy source and an imaging device. During operation of the focused energy source, the imaging device generates a time exposure image of a melted particulate forming a melt pool. In some embodiments, substantially the entire melt pool is captured in the time exposure image. The time exposure image illustrates intensity of light emitted throughout the melt pool. In some embodiments, the time exposure image is inspected to determine variations and defects in the additive manufacturing process. As a result, errors in the additive manufacturing process are corrected and the process is improved. In some embodiments, the time exposure image is used in a feed-forward process to improve the manufacturing of subsequent components.

Figure 1:
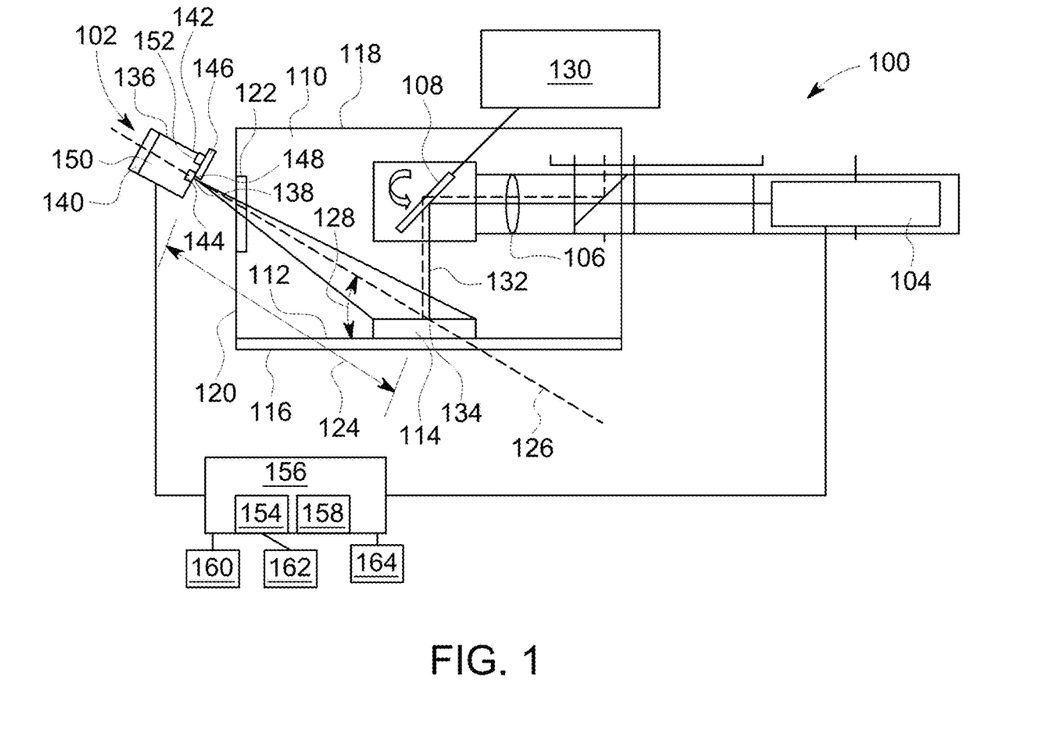
FIG. 1 is a schematic view of an exemplary additive manufacturing system including an exemplary imaging device.

FIG. 1 is a schematic view of an exemplary additive manufacturing system 100 including an imaging device 102. In the exemplary embodiment, the additive manufacturing system is a direct metal laser melting (DMLM) system. Additive manufacturing system 100 further includes a focused energy source 104 optically coupled to optics 106 and galvanometers 108 for controlling the scanning of focused energy source 104. In the exemplary embodiment, focused energy source 104 is a laser device. In alternative embodiments, additive manufacturing system 100 includes any focused energy sources 104 that enable additive manufacturing system 100 to operate as described herein. For example, in some embodiments, additive manufacturing system 100 has a first focused energy source 104 having a first power and a second focused energy source 104 having a second power different from the first power. In further embodiments, additive manufacturing system 100 has at least two focused energy sources 104 having substantially the same power output. In further embodiments, additive manufacturing system 100 includes at least one focused energy source 104 that is an electron beam generator.

In the exemplary embodiment, additive manufacturing system 100 further includes a housing 110 defining a surface 112 configured to hold a particulate 114. Housing 110 includes a bottom wall 116 defining surface 112, a top wall 118 opposite bottom wall 116, and a sidewall 120 at least partially extending between bottom wall 116 and top wall 118. In alternative embodiments, housing 110 includes any walls and surfaces that enable additive manufacturing system 100 to operate as described herein. In the exemplary embodiment, sidewall 120 defines a viewport 122 therein. In alternative embodiments, viewport 122 is defined by any portion of housing 110 that enables additive manufacturing system 100 to operate as described herein. For example, in some embodiments, viewport 122 is at least partially defined by top wall 118. In further embodiments, housing 110 defines a plurality of viewports 122.

In the exemplary embodiment, imaging device 102 is positioned adjacent viewport 122 on the exterior of housing 110. An image axis 126 extends between imaging device 102 and particulate 114 on surface 112. Accordingly, in the exemplary embodiment, image axis 126 extends through viewport 122. Imaging device 102 is spaced a distance 124 from surface 112 measured along image axis 126. In particular, image axis 126 extends through aperture 148 of imaging device 102. In some embodiments, distance 124 is in a range between about 15 centimeters (cm) (6 inches (in.)) and about 152 cm (60 in.). In further embodiments, distance 124 is in a range between about 30 cm (12 in.) and about 91 mm (36 in.). In the exemplary embodiment, distance 124 is approximately 61 cm (24 in.) In alternative embodiments, imaging device 102 is spaced any distance 124 from surface 112 that enables imaging device 102 to operate as described herein. In the exemplary embodiment, image axis 126 makes an angle 128 with surface 112. In some embodiments, image axis 126 and surface 112 make an angle 128 in a range between about 70° and about 40°. In further embodiments, image axis 126 and surface 112 make an angle 128 in a range between about 80° and about 20°. In the exemplary embodiment, image axis 126 and surface 112 make an angle 128 of approximately 45°. In alternative embodiments, angle 128 is any angle that enables imaging device 102 to operate as described herein.

As used herein, the term "field of view" refers to the extent of an object that imaging device 102 captures in an image. In the exemplary embodiment, the field of view of imaging device 102 is in reference to surface 112 and depends on the position and orientation of imaging device 102 in relation to surface 112. The field of view of imaging device 102 is adjusted by adjusting components of imaging device 102, such as optics, and the distance between surface 112 and imaging device 102. In the exemplary embodiment, imaging device 102 has a field of view of surface 112 of approximately 250 millimeters (mm)×250 mm. In alternative embodiments, imaging device 102 has any field of view that enables imaging device 102 to operate as described herein. For example, in some embodiments, imaging device 102 is disposed adjacent top wall 118 and has a field of view of surface 112 of approximately 250 mm×280 mm. In further embodiments, a plurality of imaging devices 102 are used to a create a field of view sufficient to cover a larger surface 112 without substantially reducing resolution.

In the exemplary embodiment, additive manufacturing system 100 also includes a computer control system, or controller 130. Galvanometers 108 are controlled by controller 130 and deflect a beam 132 of focused energy source 104 along a predetermined path on surface 112. In some embodiments, galvanometers 108 include two-dimension (2D) scan galvanometers, three-dimension (3D) scan galvanometers, dynamic focusing galvanometers, and/or any other galvanometer system that deflect beam 132 of focused energy source 104. In alternative embodiments, galvanometers 108 deflect a plurality of beams 132 along at least one predetermined path.

Additive manufacturing system 100 is operated to fabricate a component 134 by a layer-by-layer manufacturing process. Component 134 is fabricated from an electronic representation of the 3D geometry of component 134. In some embodiments, the electronic representation is produced in a computer aided design (CAD) or similar file. In alternative embodiments, the electronic representation is any electronic representation that enables additive manufacturing system 100 to operate as described herein. In the exemplary embodiment, the CAD file of component 134 is converted into a layer-by-layer format that includes a plurality of build parameters for each layer. In the exemplary embodiment, component 134 is arranged electronically in a desired orientation relative to the origin of the coordinate system used in additive manufacturing system 100. The geometry of component 134 is sliced into a stack of layers of a desired thickness, such that the geometry of each layer is an outline of the cross-section through component 134 at that particular layer location. A "toolpath" or "toolpaths" are generated across the geometry of a respective layer. The build parameters are applied along the toolpath or toolpaths to fabricate that layer of component 134 from the material used to construct component 134. The steps are repeated for each respective layer of component 134 geometry. Once the process is completed, an electronic computer build file (or files) is generated including all of the layers. The build file is loaded into controller 130 of additive manufacturing system 100 to control the system during fabrication of each layer.

After the build file is loaded into controller 130, additive manufacturing system 100 is operated to generate component 134 by implementing the layer-by-layer manufacturing process, such as a DMLM method. The exemplary layer-by-layer additive manufacturing process does not use a pre-existing article as the precursor to the final component, rather the process produces component 134 from a raw material in a configurable form, such as particulate 114. For example, without limitation, a steel component is additively manufactured using a steel powder. Additive manufacturing system 100 enables fabrication of components using a broad range of materials, for example, without limitation, metals, ceramics, and polymers. In alternative embodiments, DMLM fabricates components from any materials that enable additive manufacturing system 100 to operate as described herein.

As used herein, the term "parameter" refers to characteristics that are used to define the operating conditions of additive manufacturing system 100, such as a power output of focused energy source 104, a vector scanning speed of focused energy source 104, a raster power output of focused energy source 104, a raster scanning speed of focused energy source 104, a raster tool path of focused energy source 104, and a contour power output of focused energy source 104 within additive manufacturing system 100. In some embodiments, the parameters are initially input by a user into controller 130. The parameters represent a given operating state of additive manufacturing system 100. In general, during raster scanning, beam 132 is scanned sequentially along a series of substantially straight lines spaced apart and parallel to each other. During vector scanning, beam 132 is generally scanned sequentially along a series of substantially straight lines or vectors, where the orientations of the vectors relative to each other sometimes varies. In general, the ending point of one vector coincides with the beginning point of the next vector. Vector scanning is generally used to define the outer contours of a component, whereas raster scanning is generally used to "fill" the spaces enclosed by the contour, where the component is solid.

In the exemplary embodiment, imaging device 102 includes a camera 136 including a lens 138, a sensor 140, a casing 142, a filter 144, and a shutter 146. Casing 142 defines an aperture 148 for light to enter an interior space 150 defined by casing 142. Lens 138, filter 144, and shutter 146 are disposed adjacent aperture 148. Lens 138 directs and focuses light on sensor 140, which is disposed in interior space 150. Filter 144 filters light and inhibits overexposure of sensor 140. In the exemplary embodiment, filter 144 is configured to reduce the intense light emitted by focused energy source 104. In alternative embodiments, camera 136 is includes any components that enable imaging device 102 to operate as described herein.

In the exemplary embodiment, shutter 146 is positionable between an open position that allows light to travel through aperture 148 and a closed position that inhibits light traveling through aperture 148. In the exemplary embodiment, shutter 146 is configured to be maintained in the open position and in the closed position for predetermined periods of time. For example, in some embodiments, shutter 146 is in the open position for a period of time longer than about 1 minute. In further embodiments, shutter 146 is in the open position for a period of time longer than about ten minutes. In the exemplary embodiment, shutter 146 is in the open position for a period of time in a range between about 1 minute and about 10 minutes. In some embodiments, the period of time is determined at least in part based on the build time of a component formed by additive manufacturing system 100. In alternative embodiments, shutter 146 is in the open position and in the closed position for any periods of time that enable imaging device 102 to operate as described herein. For example, in some embodiments, shutter 146 moves between the open position and the closed position in a sequence of exposures that are configured to generate the time exposure image. In some embodiments, the total time shutter 146 is in the open position during the sequence of exposures is longer than about 1 minute. The sequence of exposures reduces the amount of stray light from adjacent portions of the build that is included in the time exposure image. As a result, in some embodiments, the time exposure image generated from a sequence of exposures is more detailed with than an image generated from an exposure with the shutter maintained in the open position.

In the exemplary embodiment, imaging device 102 includes a triggering component 152 to control exposure of sensor 140 to light. Triggering component 152 facilitates shutter 146 being in the open position such that sensor 140 is exposed to sufficient light to generate a time exposure image. In alternative embodiments, triggering component 152 is any mechanism that enables imaging device 102 to operate as described herein. In the exemplary embodiment, triggering component 152 receives a signal relating to an operating characteristic of focused energy source 104. For example, in some embodiments, triggering component 152 receives a signal at the commencement and completion of a layer build. In some embodiments, triggering component receives a signal based on the amount of light in the melt pool during operation of focused energy source 104. In further embodiments, triggering component 152 receives signals based on input data, sensor information, and any other information that enables imaging device 102 to operate as described herein. In some embodiments, based on the received signals, triggering component 152 causes shutter 146 to move to the open position or the closed position and remain in the selected position for a predetermined time period or until triggering component 152 receives another signal.

During operation of imaging device 102, shutter 146 is positioned in the open position such that light is allowed to travel through aperture 148 and strike sensor 140. The light activates sensor 140 and is converted to electronic signals. In the exemplary embodiment, sensor 140 includes a plurality of pixels (not shown) that are activated by light. In alternative embodiments, sensor 140 is any sensor that enables imaging device 102 to operate as described herein. In the exemplary embodiment, shutter 146 is moved from the open position to the closed position and an image is generated based on the exposure of sensor 140 while shutter 146 was in the open position. In alternative embodiments, shutter 146 is moved between the open position and the closed position while the shutter is exposed to light. The time exposure image is generated based on the cumulative exposure of sensor 140 and/or based on digitally summing distinct exposures. In the exemplary embodiment, the image is transmitted to a processor 154 coupled to camera 136. In some embodiments, processor 154 is configured to recognize differences in light intensity in the image.

In the exemplary embodiment, shutter 146 is moved to the open position prior to focused energy source 104 generating beam 132. Shutter 146 is maintained in the open position such that sensor 140 is activated by light emitted from the weld pool as beam 132 moves along the weld pool. When shutter 146 is moved to the closed position, a time exposure image of the weld pool is generated. In alternative embodiments, shutter 146 is moved to the open position and the closed position at any times that enable additive manufacturing system 100 to operate as described herein. For example, in some embodiments, shutter 146 is moved to the open position after activation of focused energy source 104 and moved to the closed position prior to deactivation of focused energy source 104.

In the exemplary embodiment, controller 130 is any controller typically provided by a manufacturer of additive manufacturing system 100 to control operation of additive manufacturing system 100. In some embodiments, controller 130 is a computer system that includes at least one processor (not shown) and at least one memory device (not shown). In some embodiments, controller 130 includes, for example, a 3D model of component 134 to be fabricated by additive manufacturing system 100. In some embodiments, controller 130 executes operations to control the operation of additive manufacturing system 100 based at least partially on instructions from human operators. Operations executed by controller 130 include controlling power output of focused energy source 104 and adjusting galvanometers 108 to control the scanning speed of focused energy source 104 within additive manufacturing system 100.

In the exemplary embodiment, a computing device 156 is coupled to imaging device 102 and focused energy source 104. Computing device 156 includes a memory device 158 and processor 154 coupled to memory device 158. In some embodiments, processor 154 includes one or more processing units, such as, without limitation, a multi-core configuration. In the exemplary embodiment, processor 154 includes a field programmable gate array (FPGA). Alternatively, processor 154 is any type of processor that permits computing device 156 to operate as described herein. In some embodiments, executable instructions are stored in memory device 158. Computing device 156 is configurable to perform one or more operations described herein by programming processor 154. For example, processor 154 is programmed by encoding an operation as one or more executable instructions and providing the executable instructions in memory device 158. In the exemplary embodiment, memory device 158 is one or more devices that enable storage and retrieval of information such as executable instructions or other data. In some embodiments, memory device 158 includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

In some embodiments, memory device 158 is configured to store build parameters including, without limitation, real-time and historical build parameter values, or any other type of data. In the exemplary embodiment, memory device 158 stores images generated by imaging device 102. In alternative embodiments, memory device 158 stores any data that enable additive manufacturing system 100 to operate as described herein. In some embodiments, processor 154 removes or "purges" data from memory device 158 based on the age of the data. For example, processor 154 overwrites previously recorded and stored data associated with a subsequent time or event. In addition, or alternatively, processor 154 removes data that exceeds a predetermined time interval. In addition, memory device 158 includes, without limitation, sufficient data, algorithms, and commands to facilitate monitoring and measuring of build parameters and the geometric conditions of component 134 fabricated by additive manufacturing system 100.

In some embodiments, computing device 156 includes a presentation interface 160 coupled to processor 154. Presentation interface 160 presents information, such as images generated by imaging device 102, to a user. In one embodiment, presentation interface 160 includes a display adapter (not shown) coupled to a display device (not shown), such as a cathode ray tube (CRT), a liquid crystal display (LCD), an organic LED (OLED) display, or an "electronic ink" display. In some embodiments, presentation interface 160 includes one or more display devices. In addition, or alternatively, presentation interface 160 includes an audio output device (not shown), for example, without limitation, an audio adapter or a speaker (not shown).

In some embodiments, computing device 156 includes a user input interface 162. In the exemplary embodiment, user input interface 162 is coupled to processor 154 and receives input from the user. In some embodiments, user input interface 162 includes, for example, without limitation, a keyboard, a pointing device, a mouse, a stylus, a touch sensitive panel, such as, without limitation, a touch pad or a touch screen, and/or an audio input interface, such as, without limitation, a microphone. In further embodiments, a single component, such as a touch screen, functions as both a display device of presentation interface 160 and user input interface 162.

In the exemplary embodiment, a communication interface 164 is coupled to processor 154 and is configured to be coupled in communication with one or more other devices, such as imaging device 102, and to perform input and output operations with respect to such devices while performing as an input channel. For example, in some embodiments, communication interface 164 includes, without limitation, a wired network adapter, a wireless network adapter, a mobile telecommunications adapter, a serial communication adapter, or a parallel communication adapter. Communication interface 164 receives a data signal from or transmits a data signal to one or more remote devices. For example, in an alternative embodiment, communication interface 164 of computing device 156 communicates with controller 130.

Presentation interface 160 and communication interface 164 are both capable of providing information suitable for use with the methods described herein, such as, providing information to the user or processor 154. Accordingly, presentation interface 160 and communication interface 164 are referred to as output devices. Similarly, user input interface 162 and communication interface 164 are capable of receiving information suitable for use with the methods described herein and are referred to as input devices.

Figure 2:
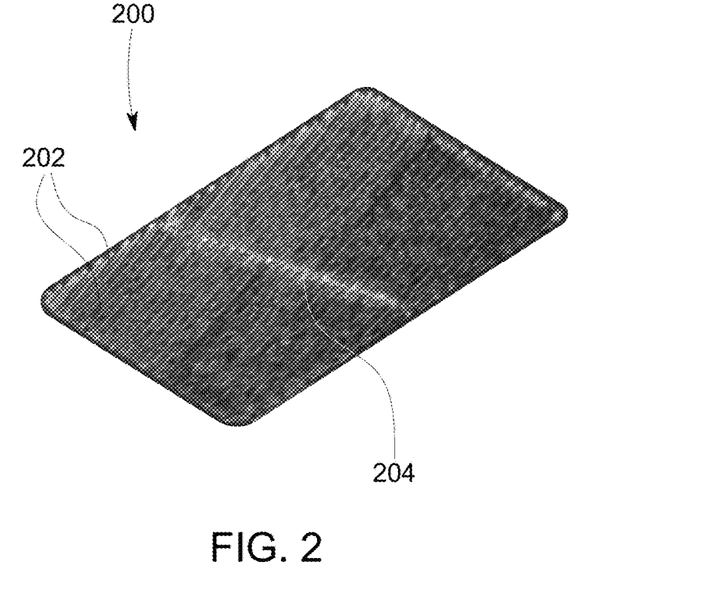
FIG. 2 is a photograph of an exemplary time exposure image generated using the imaging device shown in FIG. 1 during operation of the additive manufacturing system shown in FIG. 1.

FIG. 2 is a photograph of a time exposure image 200 generated using imaging device 102 during operation of additive manufacturing system 100. Time exposure image 200 shows a melt pool including a plurality of rasters 202. As used herein, the term "rasters" refers to a series of parallel lines along a melt path. As shown in FIG. 2, rasters 202 are alternately light, i.e., more intense, and dark, i.e., less intense. The direction of travel of beam 132 generates the alternating rasters 202 having higher intensity and lesser intensity. In particular, time exposure image 200 illustrates rasters 202 having a greater intensity along the path of beam 132 in a direction towards imaging device 102 and having a lesser intensity along the path of beam 132 in a direction away from imaging device 102. In some embodiments, time exposure image 200 indicates characteristics of the melt pool, such as the intensity of light emitted by the melt pool. For example, in the illustrated embodiment, time exposure image 200 includes a high intensity portion 204, which indicates a defect in the melt pool. Accordingly, time exposure image 200 facilitates operators making adjustments to correct the defect during formation of subsequent components.

Figure 3:
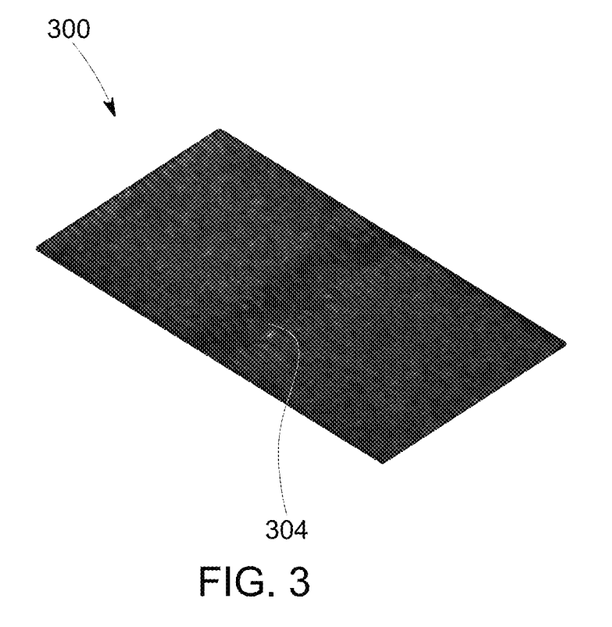
FIG. 3 is a photograph of an exemplary time exposure image generated using the imaging device shown in FIG. 1 during formation of a component including an overhanging feature.
Figure 4:
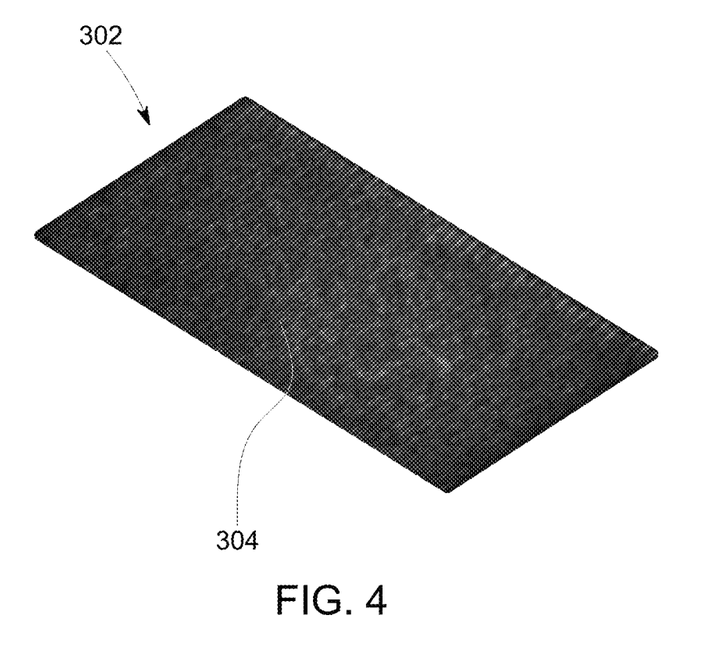
FIG. 4 is a photograph of an exemplary time exposure image generated using the imaging device shown in FIG. 1 during formation of a component including an overhanging feature.

FIGS. 3 and 4 are photographs of time exposure images 300, 302 generated using imaging device 102 during formation of a component including an overhanging feature 304. Time exposure image 300 illustrates that the melt pool has at least partially collapsed adjacent overhanging feature 304. Time exposure image 302 illustrates that overhanging feature 304 has been at least partially filled during formation of subsequent layers. Operators inspecting and comparing time exposure images 300, 302 will determine any necessary corrections to the manufacturing process for the formation of overhanging feature 304 in subsequent components.

In reference to FIGS. 1-4, an exemplary method of manufacturing a part using additive manufacturing system 100 includes depositing a first layer of particulate 114 on surface 112. Shutter 146 of imaging device 102 is moved to the open position and maintained in the open position. In some embodiments, shutter 146 is maintained in the open position for longer than 1 minute. In the exemplary embodiment, shutter 146 is maintained in the open position for a period of time in a range between about 1 minute and about 10 minutes. In alternative embodiments, shutter 146 is maintained in the open position for any period of time that enables imaging device 102 to operate as described herein.

In the exemplary embodiment, beam 132 is directed toward the first layer of particulate 114 on surface 112 and particulate 114 is heated to a melting point. Particulate 114 at least partially melts to form a melt pool, which emits light. In some embodiments, controller 130 controls additive manufacturing system 100 to direct beam 132 from focused energy source 104 towards particulate 114. Controller 130 controls the movement of galvanometers 108 to scan beam 132 across particulate 114 on surface 112 according to a predetermined path defined by the build file for component 134 to form a melt path. Camera 136 is positioned in relation to surface 112 such that the field of view of camera 136 encompasses a portion of the melt path defining rasters 202. In the exemplary embodiment, light from the melt pool travels through aperture 148 and strikes sensor 140 while shutter 146 is maintained in the open position. Shutter 146 is moved to the closed position and camera 136 generates time exposure image 200, 300, and 304 of the melt pool. In some embodiments, camera generates a time exposure image 200, 300, and 304 of at least the portion of the melt path defining rasters 202. In some embodiments, a second layer of particulate 114 is deposited on surface 112 and the second layer of particulate 114 is heated by beam 132. In further embodiments, camera 136 generates a plurality of time exposure images 200, 300, and 304 of a component. In the exemplary embodiment, time exposure image 200, 300, and 304 is inspected to determine characteristics of the melt pool. In some embodiments, time exposure image 200, 300, and 304 is compared to an electronic image of the component to determine variations between the time exposure image and the electronic image.

The above described systems and methods relate to additive manufacturing systems, such as Direct Metal Laser Melting (DMLM) systems. The embodiments described above include a focused energy source and an imaging device. During operation of the focused energy source, the imaging device generates a time exposure image of a melted particulate forming a melt pool. In some embodiments, substantially the entire melt pool is captured in the time exposure image. The time exposure image illustrates intensity of light throughout the melt pool. In some embodiments, the time exposure image is inspected to determine variations and defects in the additive manufacturing process. As a result, errors in the additive manufacturing process are corrected and the process is improved. In some embodiments, the time exposure image is used in a feed-forward process to improve the manufacturing of subsequent components.

An exemplary technical effect of the methods and systems described herein includes at least one of: (a) imaging substantially all of the melt pool in a single layer during formation of a component; (b) determining intensity of light from the melt pool at different points; (c) relating images of the melt pool to positions; (d) reducing time and resources required for imaging the melt pool; (e) increasing the compatibility of imaging devices with different additive manufacturing systems; (f) detecting defects during the additive manufacturing process; (g) reducing product development cycle time; (h) increasing machine control for precise geometries; and (i) providing visual feedback on the melt pool.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. In some embodiments, the methods described herein are encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments for enhancing the build parameters for making additive manufactured components are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the invention may be shown in some drawings and not in others, this is for convenience only. In accordance with the principles of the invention, any feature of a drawing may be referenced or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   a surface holding a particulate;
   a focused energy source configured to generate at least one beam that moves along said surface to heat the particulate to a melting point creating a melt path;
   a camera configured to generate an image of said surface as the at least one beam moves along said surface, said camera having a field of view, said camera positioned in relation to said surface such that the field of view encompasses a portion of the melt path defining a plurality of rasters, wherein said camera generates a time exposure image of at least the portion of the melt path defining the plurality of rasters by positioning a shutter of the camera in an open position for a period of time longer than one minute; and
   a trigger coupled to said camera and configured to control positioning of said shutter based on a build time of a component formed by the additive manufacturing system, wherein said trigger is configured to position said shutter in the open position at the commencement of a layer build and position said shutter in a closed position at the completion of the layer build.

2. The additive manufacturing system in accordance with claim 1 further comprising a processor for processing the time exposure image, said processor configured to recognize differences in light intensity within the time exposure image.

3. The additive manufacturing system in accordance with claim 1 wherein the shutter is positionable between the open position that allows light to travel through an aperture and a closed position that inhibits light traveling through the aperture, wherein the shutter controls the exposure time of the camera.

4. The additive manufacturing system in accordance with claim 1 further comprising a housing, said housing defining a viewport therein, said camera positioned adjacent said viewport.

5. The additive manufacturing system in accordance with claim 4, wherein said housing comprises a bottom wall, a top wall opposite said bottom wall, and a sidewall at least partially extending between said bottom wall and said top, said bottom wall at least partially defining said surface.

6. The additive manufacturing system in accordance with claim 5, wherein said viewport is defined by said sidewall.

7. A method of manufacturing a part using an additive manufacturing system, said method comprising:
   depositing a layer of particulate on a surface;
   heating the particulate to a melting point of the particulate using a focused energy source;
   directing a beam of the focused energy source at the particulate;
   forming a melt pool of the particulate, wherein said melt pool emits a melt pool light;
   moving the beam of the focused energy source to generate a melt pool path;
   receiving a signal indicating the commencement of a build layer of the part;
   exposing a camera to the melt pool light;
   receiving a signal indicating the completion of a build layer of the part; and
   generating a time exposure image of at least a portion of the melt pool path with the camera by positioning a shutter of the camera in an open position for a period of time longer than one minute.

8. The method in accordance with claim 7, wherein depositing a layer of particulate comprises depositing a first layer of particulate, said method further comprising depositing a second layer of particulate over at least a portion of the first layer of particulate.

9. The method in accordance with claim 7, wherein moving a beam of the focused energy source comprises moving a beam of the focused energy source along rows on the particulate, the rows on the particulate forming a plurality of rasters.

10. The method in accordance with claim 9 further comprising opening the shutter of the camera prior to directing the beam of the focused energy source at the particulate and closing the shutter after the plurality of rasters are formed.

11. The method in accordance with claim 7 further comprising inspecting the time exposure image to determine characteristics of the melt pool.

12. The method in accordance with claim 11, wherein inspecting the time exposure image comprises determining differences in light intensity in the time exposure image.

13. The method in accordance with claim 11 further comprising comparing the time exposure image to an electronic image of the part.

14. The method in accordance with claim 7, wherein positioning the shutter of the camera in the open position comprises positioning the shutter alternatingly in open and closed positions such that the shutter is cumulatively in the open position for a period of time longer than one minute.

15. An imaging device for use in an additive manufacturing system including a surface holding a particulate and a focused energy source configured to generate at least one beam that moves along the surface to heat the particulate to a melting point, said imaging device comprising:
   a camera comprising:
      a sensor;
      a casing defining an aperture for light to travel through and strike said sensor;
      a trigger configured to receive a signal relating to an operating characteristic of the focused energy source and to control the travel of light through the aperture based on the signal such that said camera generates a time exposure image of the particulate during operation of the focused energy source; and
      a shutter positionable between an open position that allows light to travel through the aperture and a closed position that inhibits light traveling through the aperture, said trigger configured to maintain said shutter in the open position for a period of time longer than one minute based on a build time of a component formed by the additive manufacturing system, wherein said trigger is configured to position said shutter in the open position at the commencement of a layer build and position said shutter in a closed position at the completion of the layer build.

16. The imaging device in accordance with claim 15 further comprising a processor for processing the time exposure image, said processor configured to detect light intensity in the time exposure image.

17. The imaging device in accordance with claim 15 further comprising a filter for filtering light traveling through said aperture, said filter configured to inhibit overexposure of said sensor to light during operation of the focused energy source.

* * * * *